United States Patent
Mallinson (10) Patent No.: US 12,223,415 B2
(45) Date of Patent: Feb. 11, 2025

(54) NEURAL NETWORK WITH WEIGHT-CONTROLLING AUXILIARY PATH

(71) Applicant: SiliconIntervention Inc., Kelowna (CA)

(72) Inventor: A. Martin Mallinson, Kelowna (CA)

(73) Assignee: SiliconIntervention Inc., Kelowna (CA)

( * ) Notice: Subject to any disclaimer, the term of this patent is extended or adjusted under 35 U.S.C. 154(b) by 912 days.

(21) Appl. No.: 17/330,288

(22) Filed: May 25, 2021

(65) Prior Publication Data

US 2021/0365766 A1 Nov. 25, 2021

Related U.S. Application Data

(60) Provisional application No. 63/029,644, filed on May 25, 2020.

(51) Int. Cl.
*G06N 3/063* (2023.01)
*G06N 3/04* (2023.01)

(52) U.S. Cl.
CPC ............... *G06N 3/063* (2013.01); *G06N 3/04* (2013.01)

(58) Field of Classification Search
CPC ........... G06N 3/04; G06N 3/048; G06N 3/063
See application file for complete search history.

(56) References Cited

U.S. PATENT DOCUMENTS

2017/0083811 A1* 3/2017 Cho ................... G11C 13/0007

OTHER PUBLICATIONS

Singh et al., "The Case for Registered Routing Switches in Field Programmable Gate Arrays", Feb. 13, 2001, FPGA 2001, pp. 161-169. (Year: 2001).*
Aigerim Tankimanova and Alex Pappachen James, "Neural Network-Based Analog-to-Digital Converters," Memristor and Memristive Neural Networks, Chapter 14, pp. 297-314, Apr. 2018, http://dx/doi.org/10.5772/intechopen.73038.
"Generative Adversarial Network," Wikipedia, Apr. 27, 2021, "https://en.wikipedia.org/w/index.php?title=Generative_adversarial_network&oldid=1020203126".
"Hebbian Theory," Wikipedia, May 4, 2021, "https://en.wikipedia.org/w/index.php?title=Hebbian_theory&oldid=1021433751".

* cited by examiner

*Primary Examiner* — Brent Johnston Hoover
(74) *Attorney, Agent, or Firm* — Gard & Kaslow LLP (57) ABSTRACT

An apparatus and method for creating data dependency in a neural network without the need for historical data or training is described. An "auxiliary path" that is adjacent to the main path of the neural network contains neurons that receive input data, creating non-linearity beyond that normally present in the network. The outputs of the neurons in the auxiliary path do not directly feed into the layers of neurons in the main path of the network as inputs, but instead are used to "adjust" the input weights to neurons in the main path by selecting which of existing, pre-determined weights are used for any given input. No training phase is required, and the weights in the network do not change, but instead existing paths are simply opened or closed to inputs depending upon the inputs, effectively altering the input weights to the neurons in the main path.

4 Claims, 8 Drawing Sheets

NEURAL NETWORK WITH WEIGHT-CONTROLLING AUXILIARY PATH

This application claims priority from Provisional application No. 63/029,644, filed May 25, 2020, which is incorporated by reference herein in its entirety.

FIELD OF THE INVENTION

The present invention relates generally to neural networks (NNs), and more particularly to the dependency of the state of neurons in such neural networks upon data from other neurons.

BACKGROUND OF THE INVENTION

Neural networks are now well known and are the basis of artificial intelligence (AI) solutions to problems such as handwriting recognition, image recognition and voice analysis. A neural network is generally constructed of layers of neurons, each neuron producing an output that is a weighted sum of inputs from a prior layer of the network. The weights of summation in the network encode the desired function, for example, to recognize an image or to seek a spoken word in a stream of data.

While this "layered sum of products" configuration may appear to be mathematically linear, if that were actually the case the entire network could be considered a linear "black box" and its entire functionality discovered by the independent exercise of each input in turn. Rather, neural networks are not such simple black boxes, as each neuron has what is described as an "activation function," and sometimes also has an offset.

The activation functions, and the offsets (where present), operate to add a deliberate nonlinearity to the system. This nonlinearity is the essential element that enables the behavior of neural networks and the whole field of artificial intelligence, because the nonlinearity prevents the system from reducing to a black box of trivial computation.

The output of each neuron may be expressed as:

$$Y = F(X_i \cdot W_i + C)$$

assuming summation over repeated indices, where F is the activation function and C the offset. The activation function F is strongly non-linear; common choices of the non-linearity are an inverse hyperbolic tangent function and a discontinuous function mapping positive input to equal positive output and creating near zero output for negative input (this latter function is known as the "rectified linear unit" or ReLU; when the negative output is not exactly zero it may be called "leaky ReLU").

The weights of the neural network are generally preprogrammed; in the known art, the weights may be sought in a "training phase" that is normally distinct from an "inference phase" in which the network is no longer training, but is in the desired operating mode. This training is empirical in neural networks of high complexity, as there is no closed-form calculation of the weights, potentially in the many millions, in the neural networks in use today.

Neural networks are generally trained (or learn) by processing large numbers of examples, each of which contains a known "input" and a known "result," forming probability-weighted associations between the two, that are stored within the data structure of the network itself. The training of a neutral network from a given example is usually conducted by determining the difference between the processed output of the network (often a prediction) and a target output; this difference is the error. The network then adjusts its weighted associations according, to a learning rule and using this error value.

A successive approximation to the desired functionality is used in a method such as "back propagation" or "stochastic descent," which use incremental adjustments of all the weights in the network to reduce the signal to noise ratio of the desired output and produce output that is increasingly similar to the target output. After a sufficient number of these adjustments, the training can be terminated based upon certain criteria. The training results in the desired non-linear behavior of the network, recognizing a horse in a picture for example.

The nonlinearity in a neural network may be described as a data-dependency, in that the effect of any given input upon the output of a neuron in the network depends upon the state of other data, i.e., other inputs to the neuron. Consequently, any given input to a neuron with a certain associated weight will not always produce the same output of that neuron; rather, it depends upon the state of other inputs and the consequent "operating point" of the neuron.

This is what saying that the network is not mathematically linear means. In the known art the data dependency arises due to the interaction of the activation function and the state of the local neuron inputs. The training phase will have instantiated weights in the network that are driving certain neurons to "saturation," i.e., to the point where the non-linearly is evident.

The training of neural networks takes time and requires historical target data. It would be advantageous to avoid the training phase and the need for historical data, and to create the needed data dependency in a different way.

SUMMARY OF THE INVENTION

Described herein is an apparatus and method for creating data dependency in a neural network without the need for historical data or training.

One embodiment describes a circuit for use in a neural network, comprising: a first neuron, in a main path, configured to receive a plurality of input signals through a first plurality of weighting elements and produce a first sum-of-products signal by weighting each of the input signals and adding the weighted input signals together, each of the first plurality of weighting elements connected to or disconnected from the first neuron by a plurality of switches; and a second neuron, in an auxiliary path, configured to receive the plurality of input signals through a second plurality of weighting elements, produce a second sum-of-products signal by weighting each of the input signals and adding the weighted input signals together, and control positions of the plurality of switches based on the second sum-of-products signal.

Another embodiment describes a circuit for use in a neural network, comprising: a first plurality of neurons in a main path, each of the first plurality of neurons configured to receive a plurality of input signals through a first plurality of weighting elements and produce a first plurality of sum-of-products signals by weighting each of the input signals and adding the weighted input signals together, each of the first plurality of weighting elements connected to or disconnected from each of the first plurality of neurons by a first plurality of switches; a second plurality of neurons in the main path, each of the second plurality of neurons configured to receive some or all of the first plurality of sum-of-products signals through a second plurality of weighting elements and produce a second sum-of-products signal by weighting each of the first plurality of sum-of-products signals and adding the weighted sum-of-products signals together, each of the second plurality of weighting elements connected to or disconnected from the each of the second plurality of neurons by a second plurality of switches; and a third plurality of neurons in an auxiliary path, each of the third plurality of neurons configured to receive the plurality of input signals through a third plurality of weighting elements, produce a third sum-of-products signal by weighting each of the input signals and adding the weighted input signals together, and control positions of the first or second plurality of switches based on the third sum-of-products signal.

Still another embodiment describes a method of operating a neural network, comprising: receiving in a first neuron in a main path a plurality of input signals through a first plurality of input weighting elements; receiving in a second neuron in an auxiliary path the plurality of input signals through a second plurality of input weighting elements; summing in the second neuron the weighted input signals; operating a switch using the sum from the second neuron to selectively connect the first plurality of input weighting elements to the first neuron; and summing in the first neuron the weighted input signals.

Yet another embodiment describes a method of operating a neural network, comprising: receiving, in a first layer of a main path comprising a plurality of neurons, a plurality of input signals, each neuron in the first layer receiving some of the input signals through one of a first plurality of input weighting networks; receiving, in a second layer of the main path comprising a plurality of neurons, a plurality of signals from the first layer of neurons, each neuron in the second layer receiving some of the signals from the first layer of neurons through one of a second plurality of input weighting networks; receiving in a third plurality of neurons in an auxiliary path the plurality of input signals through a third plurality of input weighting elements; summing in the third neuron the weighted input signals; operating a plurality of switches using the sums from the third plurality of neurons to selectively connect the first plurality of input weighting networks to the neurons in the first layer or the second plurality of input weighting networks to the neurons in the second layer; summing in the neurons in the first layer the weighted input signals; and summing in the neurons in the second layer the weighted signals from the first layer of neurons.

DETAILED DESCRIPTION OF THE INVENTION

Described herein is an apparatus and method for creating data dependency in a neural network without the need for historical data or training. The present approach uses data-dependent weights to create non-linearity beyond that normally present due to the activation functions of the neurons in the network.

In the present approach, an "auxiliary path" contains neurons that receive input data; the auxiliary path is not in the "main" path of the neural network that actively produces the output of the neural network. The outputs of the neurons in the auxiliary path do not directly feed into the layers of neurons in the main path of the network as inputs, but instead are used to "adjust" the input weights to neurons in the main path by selecting which of existing, pre-determined weights are used for any given input.

This is in contrast to the prior art in which the weights in the neural network are actually changed in a training phase based upon historical data. In the present approach there is no training phase. Rather, in the present approach the weights themselves do not change, as in the prior art, but instead existing paths are simply opened or closed to inputs depending upon the inputs, thus effectively altering the input weights to the neurons in the main path without having to actually change the weights in the network. Thus, not all paths will be available at a given time, as which paths are available is to an extent based upon the current inputs.

Which paths are open at a given moment results in a different type of "memory" in the neural network, thus allowing data dependency without requiring historical data or a training phase. Distributing data across the neural network also allows errors to be tolerated and corrected.

Figure 1:
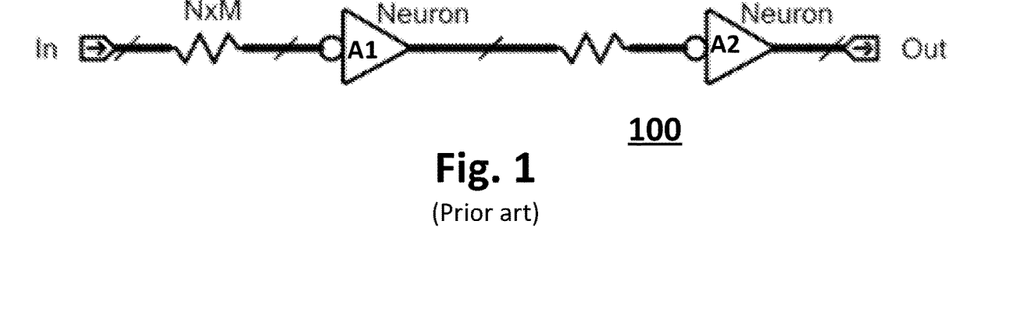
FIG. 1 is a diagram of the connections between neurons in a neural network as is known in the prior art.

FIG. 1 is a diagram of the connections between neurons in a neural network as is known in the prior art. Circuit 100 shows two neurons of a neural network constructed in the electrical domain, i.e., an analog computer configured as a neural network. The bus slashes (the small diagonal lines through the wires) are used to indicate multiple instances of a connection.

In circuit 100, there are N inputs to a first set of M neurons A1. If there are 1000 inputs connecting to 100 neurons A1, there will be a matrix of 1000×100 resistors (N×M, where N=1000, M=100) making 100 Thevenin equivalent summations at the 100 inputs to neurons A1. The outputs of the neurons A1 then go into a second layer of neurons A2 (the width and number of outputs of the neurons A1 is not specified here). In some instances, outputs of one layer may feed back to inputs of the same layer or of a prior layer.

In the known art, the resistor values are the mathematical inverse of the weights, i.e., the resistance R of a given resistor is 1/weight desired for that input to a neuron, and are pre-calculated in the training phase. As above, nonlinearity arises in the network because each neuron is assumed to be nonlinear and has, for example, a limited output voltage swing that operates as an activation function.

Figure 2:
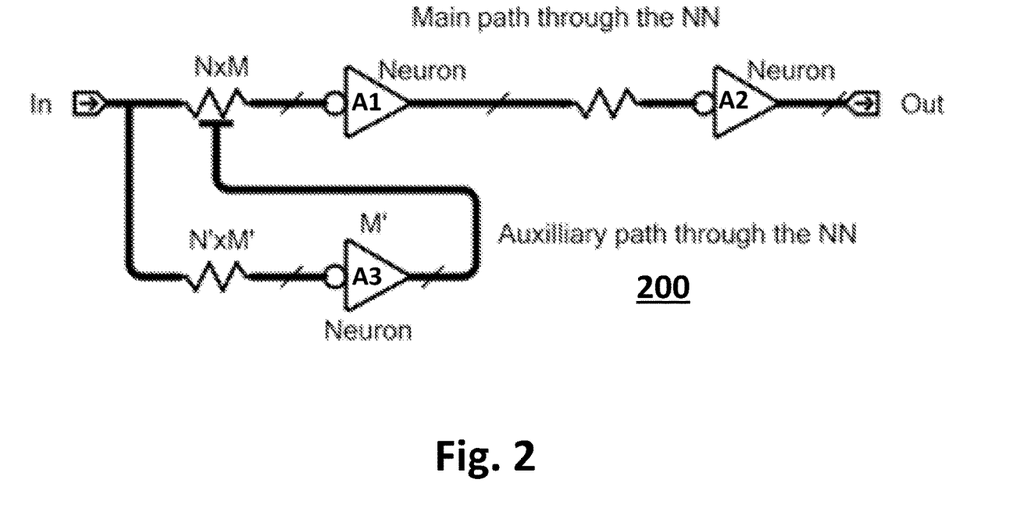
FIG. 2 is a diagram of the connections between neurons in a neural network according to one embodiment of the present approach.

FIG. 2 is a diagram of the connections between neurons in a neural network according to one embodiment of the present approach. Circuit 200 contains the elements of the known art circuit 100 of FIG. 1, and adds a second or "auxiliary" path through the neural network. This auxiliary path will typically contain strongly nonlinear elements; it may even contain true comparators (as contrasted with adders configured to subtract), devices designed to be unstable and to have just two discrete output values and thus strongly nonlinear. The outputs of the auxiliary path directly affect and modify the weights in the main (non-auxiliary) path of inputs to the first neurons A1, i.e., the N×M matrix of resistors, but are not direct inputs to the neurons A1.

One second or auxiliary path through neurons A3 sharing some or all of the same inputs as neurons A1 but having a possibly different number of inputs N' and a different number of neurons M' is shown in circuit 200. Thus, the matrix of resistors in the auxiliary path will be N'×M' rather than N×M. The outputs of the neurons A3 in this auxiliary path affect the weights of the inputs to the neurons A1 in the main path.

As a consequence, the auxiliary path is a source of predictable nonlinearity in the main path. The predictable nature of this nonlinearity allows an a-priori calculation of the weights, and thus it is not necessary to have a training phase for the neural network; rather, a closed form solution of the weights to the neurons is possible.

Figure 3:
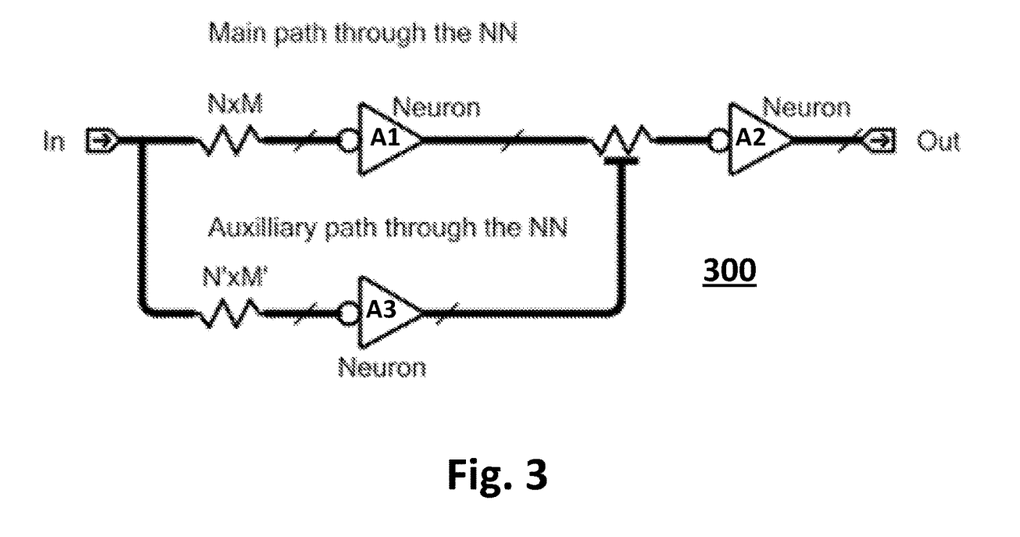
FIG. 3 is a diagram of the connections between neurons in a neural network according to another embodiment of the present approach.

FIG. 3 is a diagram of the connections between neurons in a neural network according to another embodiment of the present approach. As with circuit 200 of FIG. 2, circuit 300 adds an auxiliary path through the neural network. Now, however, while the auxiliary path receives some or all of the same inputs that are provided to neurons A1, the outputs of neurons A3 do not affect the inputs to neurons A1 as in circuit 200, but rather affect the inputs to the neurons A2 in the next layer of the neural network. Thus, a portion of the auxiliary path receiving the inputs to a particular layer need not affect the same layer, but may affect a subsequent layer, or even a prior layer, of the neural network.

It may be seen in circuits 200 and 300 of FIGS. 2 and 3, respectively, that the outputs of the neurons in the auxiliary path(s) are not themselves added to the main path input or output values. Rather, the outputs from the auxiliary path are used to modify the weights of inputs to neurons in the main path. This in effect adds another "state variable" or data dependency to the neural network.

Figure 4:
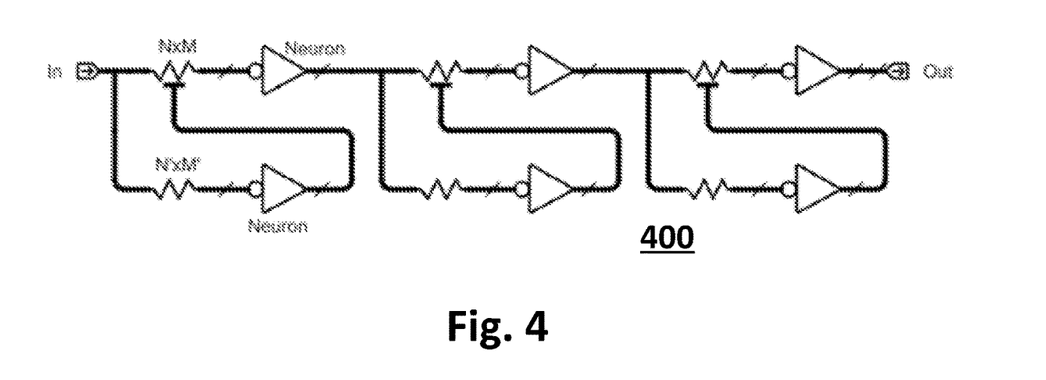
FIG. 4 is a diagram of the connections between neurons in a neural network according to still another embodiment of the present approach.

FIG. 4 is a diagram of the connections between neurons in a neural network according to still another embodiment of the present approach. In circuit 400 there are multiple instances of the auxiliary path, one auxiliary path corresponding to each layer in a neural network. While circuit 400 shows each auxiliary path affecting the inputs to neurons in the same layer of the main path, as in circuit 200 of FIG. 2, as described above the auxiliary path in any layer may affect the inputs to the neurons in the same layer, or a subsequent or prior layer. It is even possible to utilize the outputs from the auxiliary path to adjust the input weights in the auxiliary path itself.

The present approach is able to solve one long-standing problem in the field of neural networks, that of configuring a neural network to emulate or correct an analog-to-digital converter (ADC). It has been thought that to emulate an ADC, some or all of the neurons in the neural network must function at the accuracy of the desired ADC. Thus, to create an ADC of 12-bit accuracy with a neural network, the prior art teaches that at least some neurons, and perhaps all neurons, must operate with the same 12-bit accuracy. Further, prior art neural networks cannot make the discontinuous decisions necessary to get sufficient accuracy for an ADC.

The present approach solves the accuracy problem by using an imprecise auxiliary path dedicated to the task of quantizing the signal by use of a highly non-linear (comparator-like) neuron. This in turn can affect the weights in the neighboring neurons of the main path, and cause the main path to correct its quantizing error without any a-priori knowledge of what the quantizing error is.

In the present approach, the auxiliary path may contain one or more comparators functioning as neurons that may or may not be clocked and that resolve the signal into just one of two states. These neurons in the auxiliary path may then change the weights of inputs to neurons in the main path so as to modify the signal, for example, by calculating a residue of the signal in the changed main path. A sequence of such comparators in the auxiliary path may then cause the main path to function as a pipelined ADC convertor.

The result is that the application of the present approach, using an auxiliary path dependent on the data flowing in a main path and able to affect the input weights in that main path, can model an error correcting ADC because the auxiliary path outputs may be considered digital.

Further, while not a traditional "pipelined" ADC, an analog computing neural network modeling an ADC functions exactly the same and thus effectively is that ADC. An analog computing neural network benefiting from the present approach to model an ADC in a "black box" is indistinguishable from the ADC.

Figure 5:
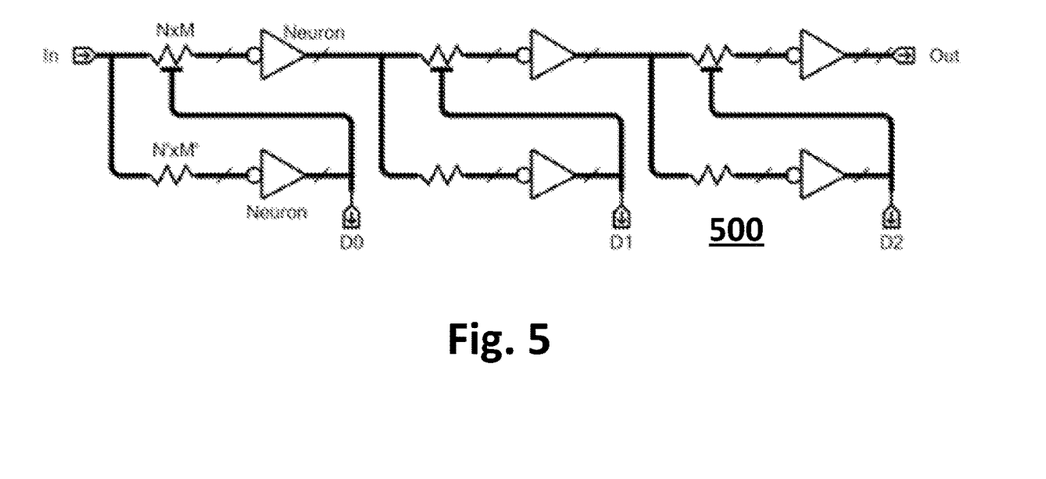
FIG. 5 is a diagram of the connections between neurons in a neural network according to yet another embodiment of the present approach.

FIG. 5 is a diagram of the connections between neurons in a neural network according to yet another embodiment of the present approach. Circuit 500 is similar to circuit 400 of FIG. 4, with the outputs of the multiple auxiliary paths considered to be digital outputs. In the general case the auxiliary path is highly non-linear and its outputs may be sampled as positive or negative and this comparison (to zero) outputs a single bit. As will be discussed below, these output bits are not the actual binary bits that constitute the output of an ADC, which would be a radix-2 number, but rather have some lower radix.

In the above embodiments using the present approach, the weights of the inputs to the neurons in the main path are adjustable. There are a number of means known in the art to make the weights in the main path adjustable. For example, U.S. patent application Ser. No. 16/806,264, commonly owned by the applicant of the present application, teaches one method of making adjustable weights in a neural network.

Figure 6:
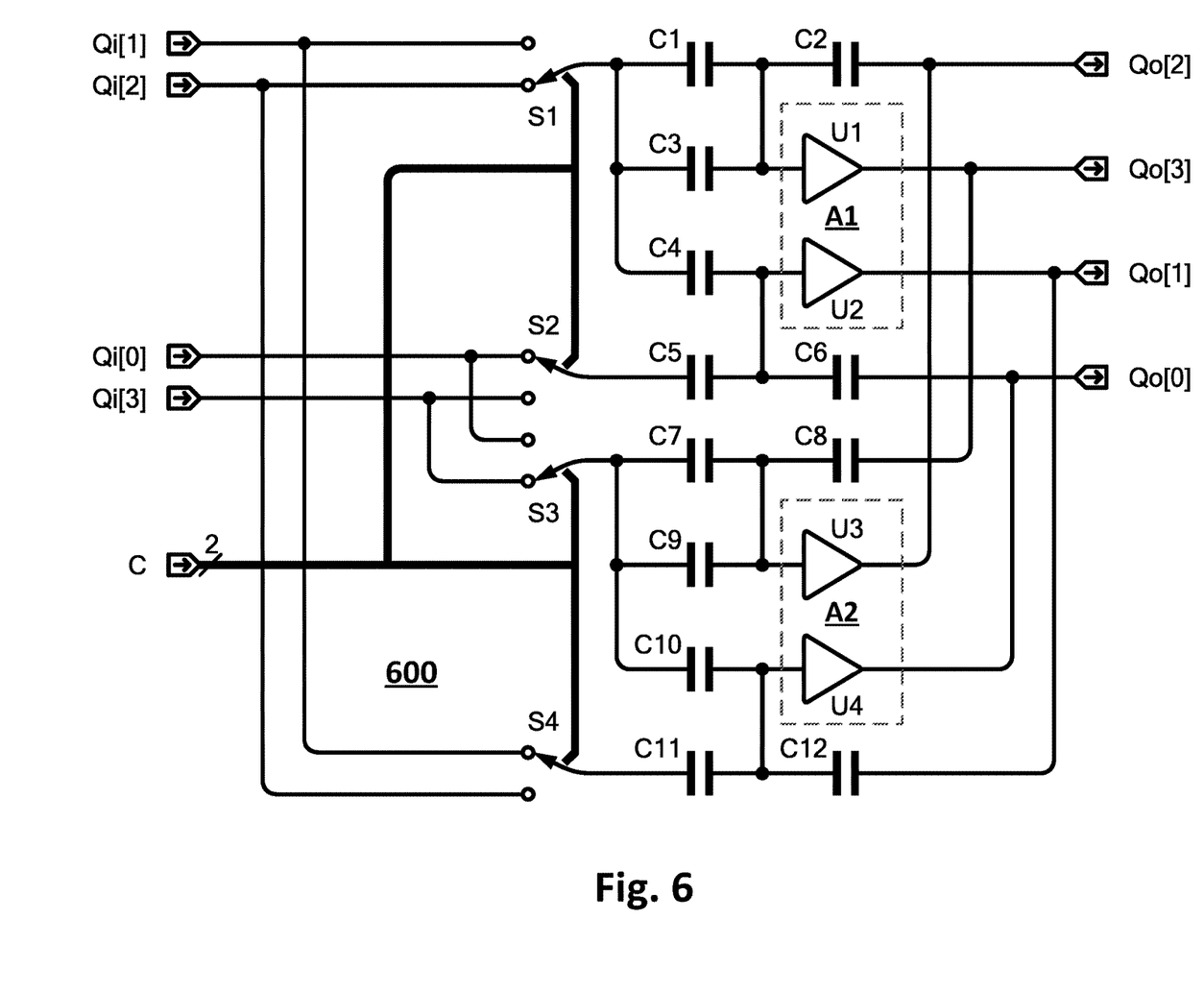
FIG. 6 is a diagram of neurons in the main path of a neural network with adjustable input weights according to one embodiment of the present approach.

FIG. 6 is a diagram of a circuit 600 containing two neurons in the main path of a neural network with adjustable input weights according to one embodiment of the present approach. This embodiment uses switches and capacitors operating in a charge-transfer mode to enable the modifiable weights in the main path.

Neurons A1 and A2 are implemented as virtual ground amplifiers, using amplifiers U1 to U4. Each neuron A1 and A2 is a differential circuit operating in charge transfer mode. As is known in the art, "charge transfer" mode means that the signal is the charge that is moved from the "weighting"

capacitors C1, C3, C4 and C5 to the output capacitors C2 and C6 through neuron A1, and from weighting capacitors C7, C9, C10 and C11 to output capacitors C8 and C12 through neuron A2. In the illustrated embodiment, capacitors C7 to C12 in neuron A2 have the same values as capacitors C1 to C6 in neuron A1.

The present approach is characterized by the auxiliary input signal shown as the port 'C' in FIG. 6. This input signal can modify the weights because it controls switches S1, S2, S3 and S4 that connect the weighting capacitors depending upon the state of the switches.

In circuit 600, the Qi input signal is a four-bit bus with signals Qi[0], Qi[1], Qi[2] and Qi[3]) from the prior layer. In the switch positions shown in circuit 600, input bit Qi[0] is connected to capacitor C5 in neuron A1, while input bit Qi[1] feeds capacitor C11 in the neuron A2. Input bit Qi[2] connects to capacitors C1, C3 and C4 in neuron A1, and input bit Qi[3] feeds neuron A2 through capacitors C7, C9 and C10. Thus, in the switch position shown the weights for the amplifiers U1 and U2 configured to make neuron A1 are:

$$U1 = Qi[2,3]*(C1+C2)$$

$$U2 = Qi[0,1]*C5 + Qi[2,3]*C4$$

Similar weights apply to amplifiers U3 and U4 in neuron A2, since as above capacitors C7 to C12 have the same values as capacitors C1 to C6.

We may clarify further by expressing this as a matrix, noting that the inputs Qi and outputs Qo(Qo[0], Qo[1], Qo[2]] and Qo[3]) connect as follows:

$$\begin{bmatrix} Qo0 \\ Qo1 \\ Qo2 \\ Qo3 \end{bmatrix} = \begin{bmatrix} & & C5 & & C4 \\ C5 & & C4 & & \\ & & & & C1+C3 \\ & & C1+C3 & & \end{bmatrix} \cdot \begin{bmatrix} Qi0 \\ Qi1 \\ Qi2 \\ Qi3 \end{bmatrix}$$

When the switches S1 to S4 are in the alternate position the matrix is:

$$\begin{bmatrix} Qo0 \\ Qo1 \\ Qo2 \\ Qo3 \end{bmatrix} = \begin{bmatrix} C4 & & & C5 \\ & & C4 & & C5 \\ C1+C3 & & & & \\ & & C1+C3 & & \end{bmatrix} \cdot \begin{bmatrix} Qi0 \\ Qi1 \\ Qi2 \\ Qi3 \end{bmatrix}$$

Note that only the values (i.e., weights) of input capacitors C1, C3, C4 and C5 are referenced here, since the values of capacitors C7, C9, C10 and C11 are the same as those of capacitors C1, C3, C4 and C5, respectively.

Capacitors C1 and C3 are always used together, i.e., in summation, and thus could be replaced by a single capacitor. However, circuit 600 will work if all of the capacitors are the same value. In such a case, keeping capacitors C1 and C3 separate has a practical consequence in that they will match better in the implementation. Capacitors C1 and C3 are together a weight of two, each accurately matching to capacitor C4 or C5 with a weight of one; it is easier to manufacture capacitors all having the same nominal value, rather than trying to match a capacitor of twice the nominal value, i.e., C1+C3, to the others.

The present approach thus utilizes the auxiliary control signal C that affects the capacitor weights, by causing one of two weight matrices to be active in the example of circuit 600. Circuit 600 is one embodiment of the adjustable weight elements as in the input resistor network shown in FIG. 2 and labeled as N×M.

It should also be noted that each of the output Qo and input Qi is a pair of differential signals, but this is not necessary in the present approach, which may also be used with single-ended signals.

Figure 7:
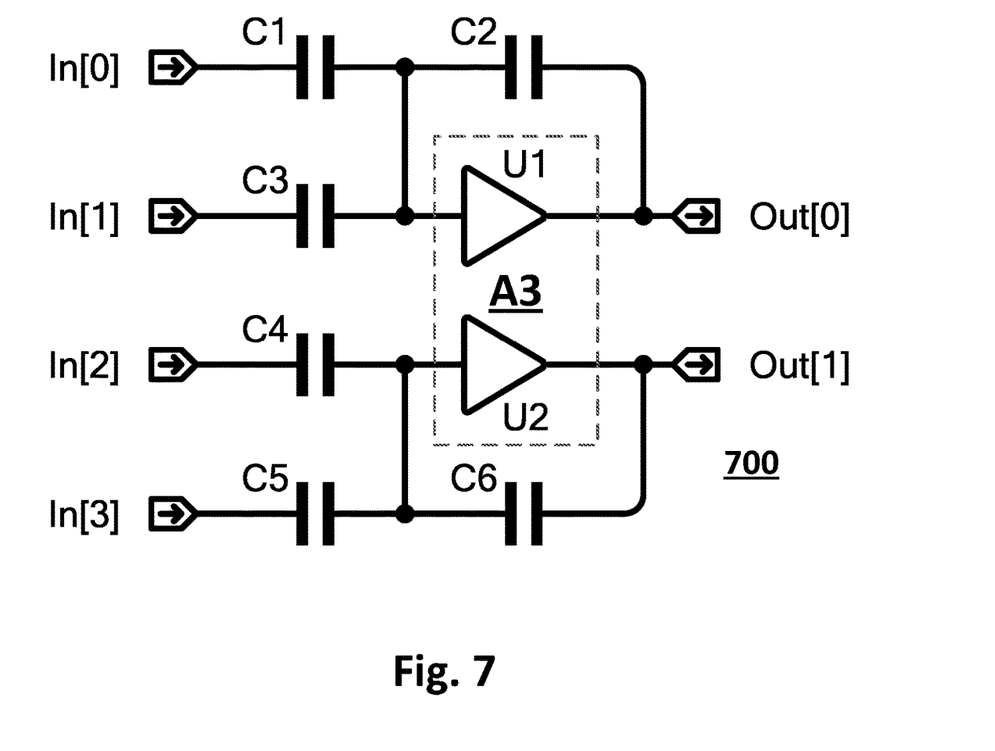
FIG. 7 is a diagram of a neuron in an auxiliary path in a neural network according to one embodiment of the present approach.

FIG. 7 is a diagram of a neuron in an auxiliary path in a neural network according to one embodiment of the present approach.

Circuit 700 includes a neuron A3 implemented similarly to neurons A1 and A2 in circuit 600 of FIG. 6, but unlike neurons A1 and A2, neuron A3 has positive feedback. (Neurons A1 and A2 of circuit 600 will be seen to have negative feedback due to the swapped connections of C2 and C6 as they connect to neurons A1 and A2 respectively). The positive feedback ensures a highly non-linear response of neuron A3: its output 'Out' will snap between two distinct states, these states being the limit of the output of the neuron A3. Neuron A3 may be considered a differential-in/differential-out operational amplifier ("op-amp"), a device well known in the art.

The detail of the construction of the analog amplifiers configured as neurons shown here is not necessary to the present approach. It will be evident to those of skill in the art in light of the teachings herein how the neuron amplifier may be constructed, and it will also be evident how other highly non-linear auxiliary path neurons may be made. This hysterical, positive feedback configuration is an illustrated embodiment of the auxiliary path since in this ADC example two distinct states are defined to choose between the two weight configurations as detailed in the matrices.

Figure 8:
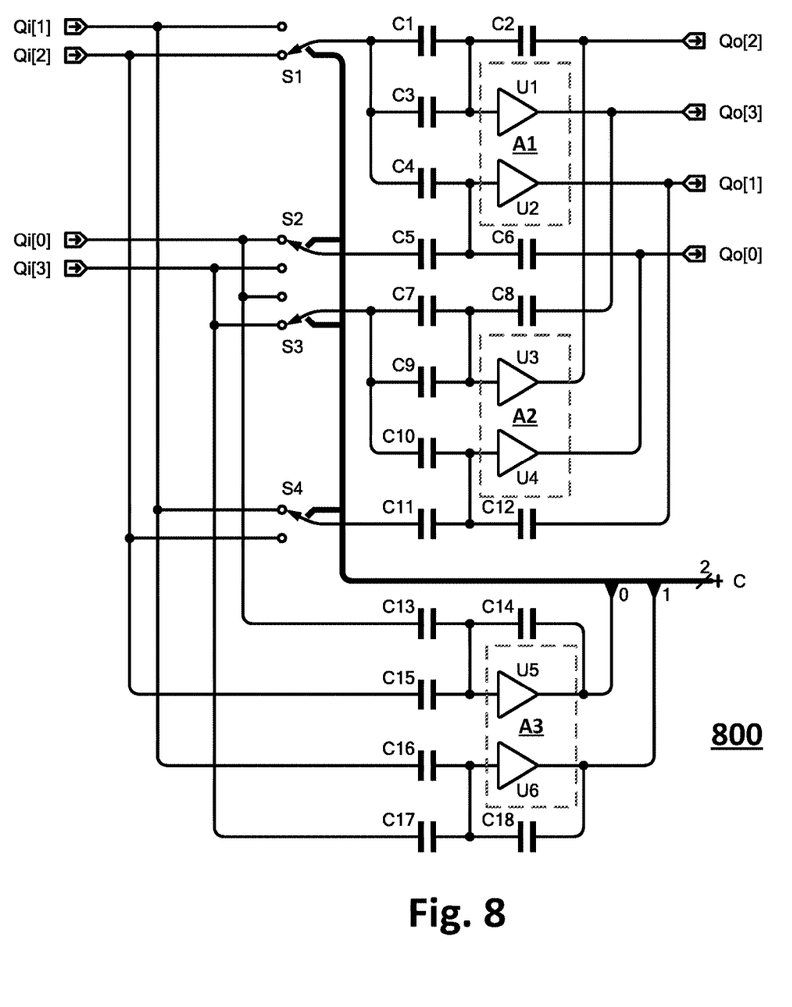
FIG. 8 is a diagram of the connections between neurons in the main path and an auxiliary path in a neural network according to yet another embodiment of the present approach.

FIG. 8 is a diagram of the connections between neurons in the main path and an auxiliary path in a neural network according to yet another embodiment of the present approach. In circuit 800, an auxiliary path element such as circuit 700 of FIG. 7 is combined with a portion of a main path such as that shown in circuit 600 of FIG. 6. The main path portion of circuit 800 includes neurons A1 and A2, weighting capacitors C1, C3, C4, C5, C7, C9, C10 and C11, and feedback capacitors C2, C6, C8 and C12 as shown in FIG. 6.

The auxiliary path portion of circuit 800 includes a neuron A3, weighting capacitors C13, C15, C16 and C17, and feedback capacitors C14 and C18 in a configuration like that of FIG. 6. Neuron A3 provides an output that is used to modify the weights in the main path; the weights neuron A3 modifies are the capacitor-based weights that form the input to the main path neurons A1 and A2.

It will be apparent to one of skill in the art that a sequence of such pairs of main and auxiliary neurons as described herein will be sufficient to create an ADC.

Figure 9:
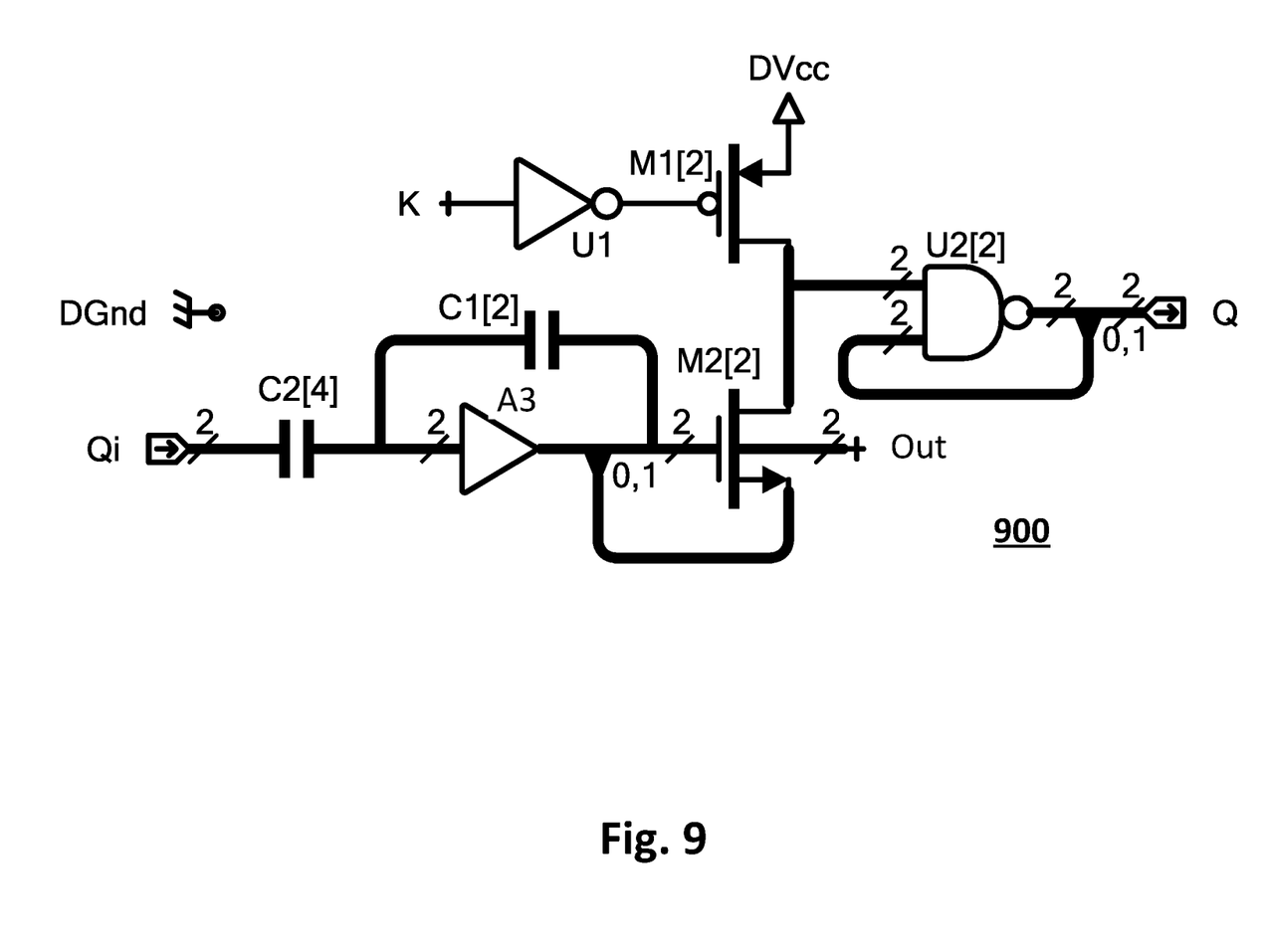
FIG. 9 is a diagram of the connections between neurons in a neural network according to yet another embodiment of the present approach.

FIG. 9 shows how the output of the auxiliary path neuron may be extracted as a bit of a digital signal.

In circuit 900 of FIG. 9, the same components as in FIG. 7, capacitors C1 and C2 and neuron A3, are configured as in FIG. 7 to make the auxiliary path. Note that circuit 900 is drawn as a single-ended device, with the bus slashes again indicating multiple lines due to the differential nature of the signal.

In this ADC example the desired non-linearity is again achieved with positive feedback. The output of neuron A3 will therefore exhibit hysteresis as the input signal Qi changes. One means to render that output static as a digital signal is shown. When the wires of the two-bit output bus Out differ by more than the threshold of the transistor pair M2, one or the other of the M2 pair output drains will be pulled low, flipping a latch made from a pair of NAND gates U2.

Once flipped, the cross-coupled gates of NAND gates U2 will hold a fixed digital state. The conversion of Qi to a digital value is reset, i.e., allowed to acquire a potentially different state, by briefly driving a signal K high thus activating a pair of transistors M1 to pull the drains on transistor pair M2 back to the high level shown as "Dvcc". Consequently, upon the release of K (the return of K to a low level) the M2 transistor pair once again causes the cross-coupled gate to acquire a new and potentially different logic state representing the auxiliary path output again as a digital signal.

As above, the bits output as the respective values of Out by a series of auxiliary path devices such as circuit 900 are not the actual binary bits that constitute the output of an ADC, which would be a radix-2 number, but rather have some lower radix, such as radix-1.6. This provides some redundancy and allows for error correction. Those of skill in the art will appreciate that there are devices commercially available that produce radix-1.6 outputs, and that the techniques for error correction that will derive the radix-2 output from a radix-1.6 output are well known. See, for example, M. Pastre and M. Kayal, "Methodology for the Digital Calibration of Analog Circuits and Systems Using Sub-binary Radix DACs," International Journal of Microelectronics and Computer Science, Vol. 1, No. 1, pp. 25-30, 2010.

Figure 10:
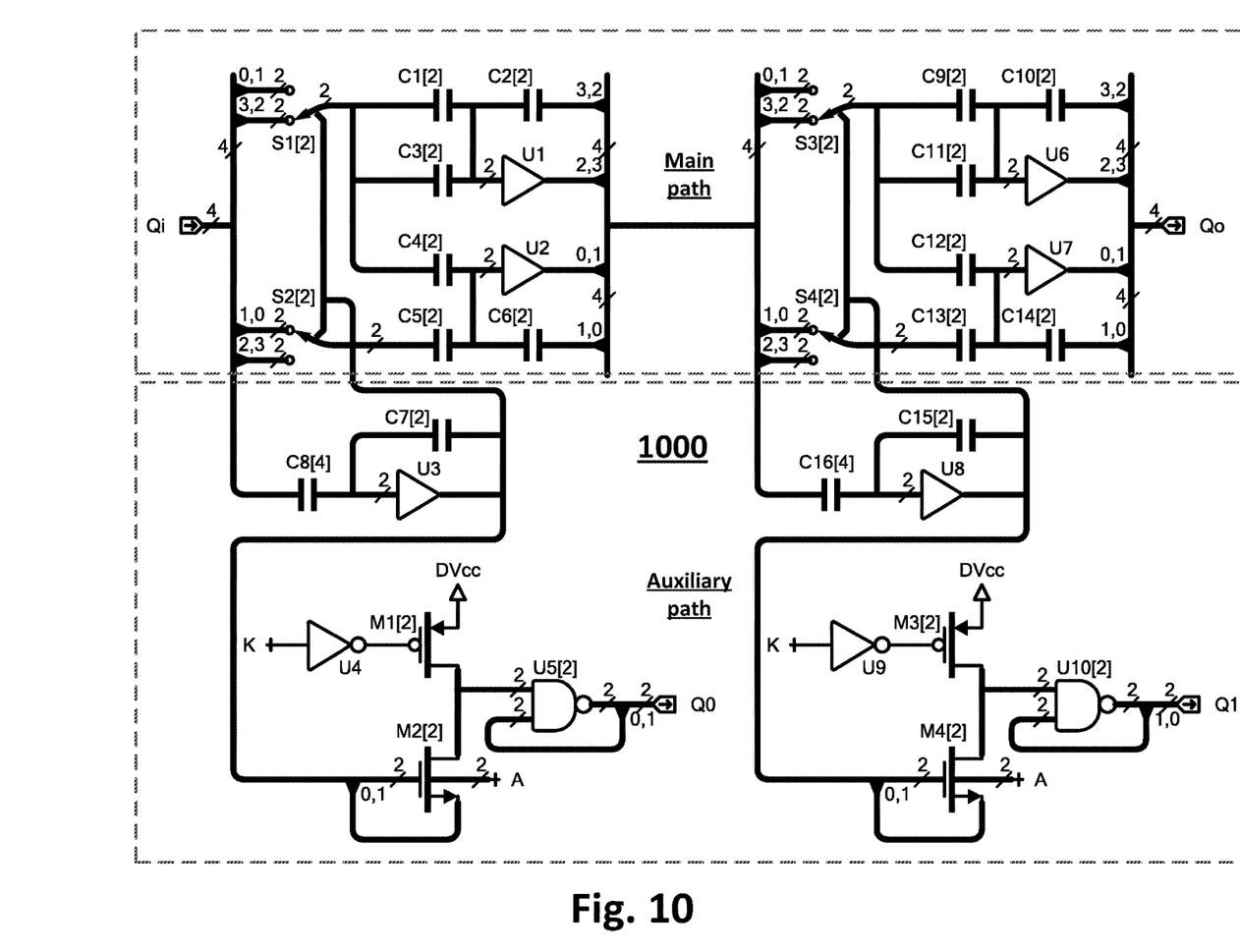
FIG. 10 is a diagram of the connections between neurons in a neural network according to yet another embodiment of the present approach.

FIG. 10 is a diagram of the connections between neurons in a neural network according to yet another embodiment of the present approach. Circuit 1000 shows how the main path and the auxiliary path create the digital output that may be cascaded to create a sequence of neurons according to the present approach. Note that circuit 1000 is drawn as a single-ended device, with the bus slashes again indicating multiple lines due to the differential nature of the signal.

The upper portion of circuit 1000, within the dashed-line box labeled "Main path," will be seen to be circuit 600 of FIG. 6 (but again drawn in single-ended form with bus slashes), while the lower portion of circuit 1000, within the dashed-line box labeled "Auxiliary path" will be seen to be circuit 900 of FIG. 9. The elements of circuit 1000 may be extended to any arbitrary number of neurons as needed to make an ADC benefiting from the present approach.

An ADC constructed in this way is able to function in the presence of imperfections in the action of the auxiliary path neurons, so that errors in the auxiliary path do not reduce the accuracy of the ADC. This is a significant benefit of the present approach; it enables, among other possibilities, an efficient neural network-based ADC.

Figure 11:
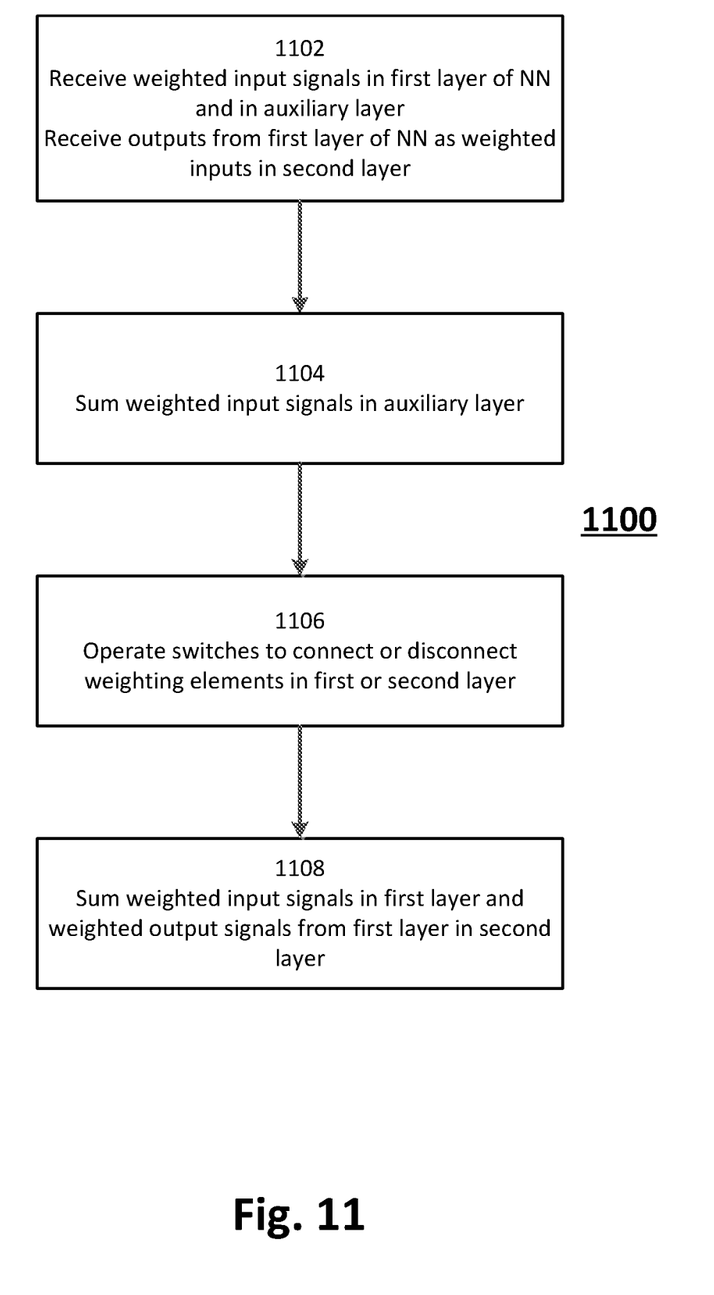
FIG. 11 is a flowchart of a method of operating a neural network according to one embodiment of the present approach.

FIG. 11 is a flowchart of a method of operating a neural network according to one embodiment of the present approach.

At step 1102, both a first layer of neurons in the neural network and an auxiliary path of neurons receive weighted input signals; the weights applied to the input signals for each neuron will typically be different. Similarly, a second layer of neurons in the neural network receives as its inputs the outputs from the first layer of neurons, again with different weights applied for each neuron in the second layer. This may occur, for example, in a circuit such as circuit 1000 of FIG. 10, with the input signals Qi being received at the left side of the circuit, and the output from the first layer being received by the second layer on the right side of the circuit through the connecting line in the middle of the circuit.

At step 1104, the neurons in the auxiliary path sum the weighted input signals that they have received.

At step 1106, the outputs from the neurons in the auxiliary path operate switches that configure the weighting elements in the main path, connecting or disconnecting the weighting elements from each input signal that they are configured to receive. In circuit 1000, switches S1 to S4 are moved depending upon the outputs from the neurons in the auxiliary path, to selectively connect or disconnect weighting capacitors C1, C3, C4, C5, C9, C11, C12 and C13.

At step 1108, the neurons in the first layer and the neurons in the second layer sum the weighted signals that they have received. The summed signals are then available to the next layer or, in the case of the last layer, as an output signal.

One of skill in the art will appreciate that although these steps are presented in an order, the process does not proceed in such an orderly fashion. Rather, the input signals may be changing, and the various circuit components, such as capacitors, transistors and amplifiers, all have time constants that result in signal calculation and transmission taking a finite time rather than being instantaneous. Thus, the steps may be regarded as all occurring in a period of time, with the exact order depending upon when the various signals are available and the circuits are able to act upon them.

One of skill in the art will also appreciate that while the description herein reflects the implementation of an analog neural network, the present approach is equally applicable to use in a digital engine such as a digital signal processor. In such a case, the switches may not be physical switches, but rather may be lines of code accessed, for example, by "if-then" branches, so that the effect of a switch is implemented by which line of code is accessed under which condition.

By combining these features, it is possible to construct a neural network that utilizes data dependency in a novel way, that relies only on current data (that is, data also being processed by neurons in the main path of the neural network in an inference rather than training mode) rather than historical data, that needs no training phase, and that is able to function as an ADC. One of skill in the art will appreciate that a neural network of any complexity may be constructed according to these principles.

The disclosed system has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than or in addition to those described above.

For example, as is well understood by those of skill in the art, various choices will be apparent to those of skill in the art. Further, the illustration of transistors and the associated feedback loops, resistors, etc., is exemplary; one of skill in the art will be able to select the appropriate number of transistors and related elements that is appropriate for a particular application.

These and other variations upon the embodiments are intended to be covered by the present disclosure, which is limited only by the appended claims.

What is claimed is:

1. A circuit for use in a neural network having a first plurality of neurons in a main path and a second plurality of neurons in an auxiliary path, comprising:
   a first neuron of the first plurality of neurons, configured to receive a plurality of input signals through a first plurality of weighting elements and produce a first sum-of-products signal by weighting each of the input signals and adding the weighted input signals together, each of the first plurality of weighting elements connected to or disconnected from the first neuron by a plurality of switches; and a second neuron of a second plurality of neurons, configured to receive the plurality of input signals through a second plurality of weighting elements, produce a second sum-of-products signal by weighting each of the input signals and adding the weighted input signals together, and control positions of the plurality of switches based on the second sum-of-products signal.

2. A circuit for use in a neural network, comprising:

a first plurality of neurons in a main path, each of the first plurality of neurons configured to receive a plurality of input signals through a first plurality of weighting elements and produce a first plurality of sum-of-products signals by weighting each of the input signals and adding the weighted input signals together, each of the first plurality of weighting elements connected to or disconnected from each of the first plurality of neurons by a first plurality of switches;

a second plurality of neurons in the main path, each of the second plurality of neurons configured to receive some or all of the first plurality of sum-of-products signals through a second plurality of weighting elements and produce a second sum-of-products signal by weighting each of the first plurality of sum-of-products signals and adding the weighted sum-of-products signals together, each of the second plurality of weighting elements connected to or disconnected from the each of the second plurality of neurons by a second plurality of switches; and a third plurality of neurons in an auxiliary path, each of the third plurality of neurons configured to receive the plurality of input signals through a third plurality of weighting elements, produce a third sum-of-products signal by weighting each of the input signals and adding the weighted input signals together, and control positions of the first or second plurality of switches based on the third sum-of-products signal.

3. A method of operating a neural network, comprising:

receiving in a first neuron of a first plurality of neurons in a main path a plurality of input signals through a first plurality of input weighting elements;

receiving in a second neuron of a second plurality of neurons in an auxiliary path the plurality of input signals through a second plurality of input weighting elements;

summing in the second neuron the weighted input signals from the second plurality of input weighting elements;

operating a plurality of switches based upon the sum from the second neuron to selectively connect the first plurality of input weighting elements to the first neuron; and summing in the first neuron the weighted input signals from the first plurality of input weighting elements.

4. A method of operating a neural network, comprising:

receiving, in a first layer of a main path comprising a plurality of neurons, a plurality of input signals, each neuron in the first layer receiving some of the input signals through one of a first plurality of input weighting networks;

receiving, in a second layer of the main path comprising a plurality of neurons, a plurality of signals from the first layer of neurons, each neuron in the second layer receiving some of the signals from the first layer of neurons through one of a second plurality of input weighting networks;

receiving in a third plurality of neurons in an auxiliary path the plurality of input signals through a third plurality of input weighting elements;

summing in the third neuron the weighted input signals from the third plurality of input weighting elements;

operating a plurality of switches using the sums from the third plurality of neurons to selectively connect the first plurality of input weighting networks to the neurons in the first layer or the second plurality of input weighting networks to the neurons in the second layer;

summing in the neurons in the first layer the weighted input signals from the first plurality of input weighting elements; and summing in the neurons in the second layer the signals from the first layer of neurons from the second plurality of input weighting elements.

* * * * *